(12) United States Patent
Fritz et al.

(10) Patent No.: US 10,938,641 B1
(45) Date of Patent: Mar. 2, 2021

(54) ON-DEMAND DEVELOPMENT ENVIRONMENT

(71) Applicant: Amazon Technologies, Inc., Seattle, WA (US)

(72) Inventors: Jonathan Andrew Fritz, Seattle, WA (US); Balaji Kannan, Cupertino, CA (US); Nivetha Purusothaman, Sunnyvale, CA (US); Parag Pramod Chaudhari, Sunnyvale, CA (US); Jalpan Randeri, Sunnyvale, CA (US); Yishan Yang, Redwood City, CA (US); Udit Mehrotra, Seattle, WA (US); Sneha Bharadwaj, San Jose, CA (US); Rui Liu, Sunnyvale, CA (US); Ajay Baliram Jadhav, Sunnyvale, CA (US); Anoop Kochummen Johnson, Fremont, CA (US); Konstantin Milyutin, Seattle, WA (US); Vignesh Rajamani, Cupertino, CA (US); Sachin Suresh Bhat, Seattle, WA (US); Anthony Virtuoso, Hawthorne, NJ (US); Stefano Stefani, Issaquah, WA (US); Rahul Pathak, Mercer Island, WA (US); Anurag Gupta, Atherton, CA (US); Ashok Kumar, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 96 days.

(21) Appl. No.: 16/186,464

(22) Filed: Nov. 9, 2018

(51) Int. Cl.
*H04L 12/24* (2006.01)
*H04L 29/08* (2006.01)
(Continued)

(52) U.S. Cl.
CPC .......... *H04L 41/0806* (2013.01); *G06F 9/455* (2013.01); *H04L 41/0856* (2013.01);
(Continued)

(58) Field of Classification Search
None
See application file for complete search history.

(56) References Cited

U.S. PATENT DOCUMENTS 6,119,247 A * 9/2000 House .................. G06F 11/362
714/38.14
6,324,647 B1 * 11/2001 Bowman-Amuah .......................
H04L 63/0227
709/223

(Continued)

*Primary Examiner* — Backhean Tiv
(74) *Attorney, Agent, or Firm* — Nicholson De Vos Webster & Elliott LLP

(57) ABSTRACT

Techniques for providing an on-demand development environment are described. A service of a provider network receives a request to launch a development environment, such as a notebook, from an electronic device. The service obtains an identification of a computing cluster hosted by the provider network. The service obtains an identification of a compute instance hosted within the provider network, the compute instance executing a software environment to host one or more development environments. The service causes the compute instance to launch a development environment. The service sends a message to configure the launched development environment to execute a computer program written in the development environment using the computing cluster. The service generates a token to secure communications between the electronic device and the development environment and sends the token to an originator of the request.

19 Claims, 7 Drawing Sheets

(51) Int. Cl.
*G06F 9/455* (2018.01)
*H04L 29/06* (2006.01)

(52) U.S. Cl.
CPC ......... *H04L 41/0893* (2013.01); *H04L 63/04* (2013.01); *H04L 67/02* (2013.01); *G06F 9/45541* (2013.01); *H04L 63/0272* (2013.01)

(56) References Cited

U.S. PATENT DOCUMENTS

| | | | | |
|---|---|---|---|---|
| 7,072,964 | B1* | 7/2006 | Whittle | H04L 12/4641 709/226 |
| 7,216,257 | B2* | 5/2007 | Kilian | G06F 11/362 714/31 |
| 7,673,180 | B1* | 3/2010 | Chen | G06F 11/362 714/38.11 |
| 9,104,798 | B2* | 8/2015 | Mohindra | G06F 11/3664 |
| 9,201,759 | B2* | 12/2015 | Wintergerst | G06F 11/3664 |
| 9,225,690 | B1* | 12/2015 | Fitch | H04L 63/04 |
| 9,244,817 | B2* | 1/2016 | Cai | G06F 11/362 |
| 9,251,039 | B2* | 2/2016 | Wu | G06F 11/3664 |
| 9,288,193 | B1* | 3/2016 | Gryb | H04L 63/08 |
| 9,313,100 | B1* | 4/2016 | Jenkins | H04L 67/02 |
| 9,594,640 | B1* | 3/2017 | Chheda | G06F 11/1448 |
| 9,632,913 | B2* | 4/2017 | Deakin | G06F 11/3644 |
| 9,754,116 | B1* | 9/2017 | Roth | G06F 21/6218 |
| 9,870,269 | B1* | 1/2018 | Viswanathan | G06F 9/5055 |
| 9,971,675 | B2* | 5/2018 | Lincoln | G06F 9/45558 |
| 10,108,452 | B2* | 10/2018 | Chen | G06F 9/505 |
| 10,120,779 | B1* | 11/2018 | Leung | G06F 11/362 |
| 10,127,140 | B2* | 11/2018 | Chan | H04L 67/28 |
| 10,268,509 | B2* | 4/2019 | Chen | G06F 9/5072 |
| 10,379,836 | B2* | 8/2019 | Agarwal | H04L 67/34 |
| 10,547,601 | B2* | 1/2020 | Lipke | G06F 21/10 |
| 10,606,576 | B1* | 3/2020 | Tung | H04L 63/104 |
| 10,810,109 | B2* | 10/2020 | Shanmugam | G06F 16/1873 |
| 2006/0036941 | A1* | 2/2006 | Neil | G06F 9/451 715/234 |
| 2006/0236093 | A1* | 10/2006 | Brok | H04L 63/0209 713/151 |
| 2006/0274695 | A1* | 12/2006 | Krishnamurthi | H04L 63/0807 370/331 |
| 2007/0140250 | A1* | 6/2007 | McAllister | H04L 45/00 370/392 |
| 2007/0192619 | A1* | 8/2007 | Gifford | G06F 21/32 713/185 |
| 2008/0250210 | A1* | 10/2008 | Ash | G06F 11/2033 711/141 |
| 2008/0307175 | A1* | 12/2008 | Hart | G06F 11/1458 711/162 |
| 2009/0165095 | A1* | 6/2009 | Ishikawa | H04L 67/14 726/4 |
| 2012/0284275 | A1* | 11/2012 | Vadrevu | G06F 16/358 707/738 |
| 2013/0227558 | A1* | 8/2013 | Du | H04L 67/18 718/1 |
| 2014/0006778 | A1* | 1/2014 | Dixon | H04L 63/08 713/168 |
| 2014/0074850 | A1* | 3/2014 | Noel | G06F 11/0709 707/741 |
| 2014/0173565 | A1* | 6/2014 | Scholl | G06F 11/3688 717/124 |
| 2014/0245298 | A1* | 8/2014 | Zhou | G06F 9/455 718/1 |
| 2014/0337965 | A1* | 11/2014 | Savini | H04L 63/08 726/15 |
| 2015/0161023 | A1* | 6/2015 | Bragstad | G06F 11/362 717/129 |
| 2015/0248336 | A1* | 9/2015 | Han | G06F 11/1469 711/162 |
| 2015/0334190 | A1* | 11/2015 | Bucks | H04L 67/10 709/227 |
| 2017/0103014 | A1* | 4/2017 | Segler | G06F 11/3688 |
| 2017/0116588 | A1* | 4/2017 | Conant | G06Q 20/3552 |
| 2017/0288982 | A1* | 10/2017 | Katsaros | H04L 41/5025 |
| 2018/0052762 | A1* | 2/2018 | Vyas | G06F 11/3668 |
| 2018/0077142 | A1* | 3/2018 | Thakkar | H04L 9/3213 |
| 2018/0129580 | A1* | 5/2018 | Merkle | G06F 11/362 |
| 2018/0165177 | A1* | 6/2018 | Gupta | H04L 67/02 |
| 2018/0285199 | A1* | 10/2018 | Mitkar | G06F 11/1451 |
| 2018/0285210 | A1* | 10/2018 | Mitkar | G06F 11/3006 |
| 2019/0207772 | A1* | 7/2019 | Hecht | H04L 9/30 |
| 2019/0289013 | A1* | 9/2019 | Makmel | H04L 67/10 |
| 2020/0019469 | A1* | 1/2020 | Khan | G06F 11/1464 |
| 2020/0057848 | A1* | 2/2020 | Hecht | G06F 21/45 |

* cited by examiner

ON-DEMAND DEVELOPMENT ENVIRONMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the following drawings.

DETAILED DESCRIPTION

Various embodiments of methods, apparatus, systems, and non-transitory computer-readable storage media for providing an on-demand development environment are described. According to some embodiments, users of a provider network can launch a development environment without knowledge of the particular computer system (sometimes referred to as a server or host) hosting the development environment or of the specific details of the configuration of the host. A service of the provider network handles the provisioning and configuration of the hosts such that the user has access to his or her development environment within seconds of making the launch request. The service handles the plumbing of the connection between the development environment host and any backend computational resources of the provider network that the user may leverage to execute his or her code. As such, users are not required to have any domain-specific knowledge of the architectural or configuration details of the provider network such as how to configure and launch a host within the provider network, how to install and setup a development environment on the host, or how to connect the development environment to the wide array of computational resources offered by the provider network. Instead, users can focus on developing compute- and/or data-intensive software applications for data analytics, data exploration, data transformation, data science, business intelligence, or machine learning that leverage the high-performance distributed computing and data storage resources of the provider network.

Figure 1:
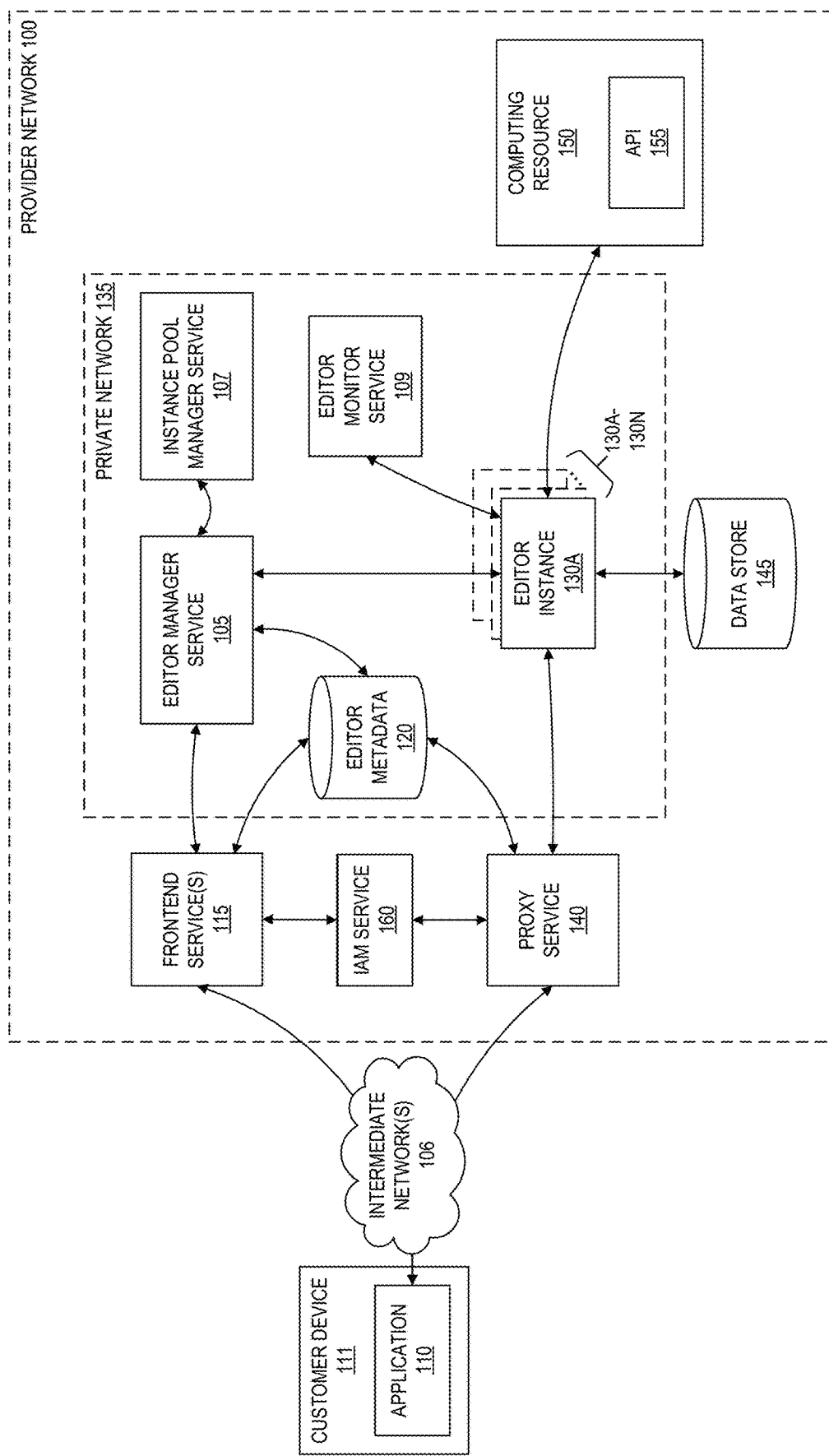
FIG. 1 is a diagram illustrating an environment for providing an on-demand development environment according to some embodiments.

FIG. 1 is a diagram illustrating an environment for providing an on-demand development environment according to some embodiments. The environment includes a customer device 111 in communication with a provider network 100 via one or more intermediate networks 106, such as the internet. The provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

A customer may leverage one or more computing resources of the provider network for compute- and/or data-intensive operations, such as a computing resource 150. Such computing resources include, but are not limited to, computing clusters and/or distributed data stores. Exemplary computing clusters include Spark clusters, Hadoop clusters, etc. Exemplary distributed data stores include Structured Query Language (SQL) or NoSQL based structured or unstructured data stores and various implementations such as MongoDB, HBase, etc. Other data stores include cloud-based object-data stores and data lakes spread across a variety of different data stores. Computing resources may further be combinations of computing and data storage resources (e.g., a computing cluster with access to multiple data stores, etc.). Note that in some contexts, a customer may refer to a business and its employees as users, although the terms user and customer may be used somewhat interchangeably. In some embodiments, a customer may lease or rent computing resources for the exclusive use of the customer and/or its users. Such computing resources are limited to only those users with permissions to access the computing resources and may be isolated from other parts of the provider network via a virtual private network 135 implemented "over-the-top" of the provider network 100. In some embodiments, computing resources are generally available to customers of the provider network 100 and provided as services. A user's usage of these generally available services may be factored into a cost attributed to the customer. In either case, the computing resources are generally accessible through one or more application programming interfaces (APIs), either directly or indirectly through other services or components of the provider network 100. For example, a computing resource may be an Apache Spark cluster including an Apache Livy API through which a user submits jobs to the cluster.

To decouple the development of applications from the underlying computing resources on which those applications execute, the provider network 100 provides users with the ability to access an on-demand development environment without having to setup or manage servers to host the development environment or to configure the development environment to communicate with the computing resource 150. The relationship between development environments and computing resources may vary. Although a single computing resource 150 is shown, a development environment may be associated with one or more computing resources and computing resources may be associated with one or more development environments. For example, a development environment may access two computing clusters, or a single computing cluster may be shared amongst separate development environments.

In some embodiments, an application 110, such as a web browser, running on the customer device 111 and in communication with the provider network 100 can launch and access a development environment, such as a Jupyter notebook or an SQL editor. The provider network 100 includes one or more frontend services 115 and a proxy service 140. In an exemplary embodiment, a user requests the launch of a development environment via the frontend service(s) 115 and communicates with a launched development environment via the proxy service 140.

The provider network 100 includes an identity and access management (JAM) service 160. The IAM service 160 authenticates users as they attempt to access the provider network 100 and verifies the users have permissions to use specific resources of the provider network. For example, the frontend service(s) 115 may receive a user's credentials to authenticate the user with the IAM service 160 to verify the identity of the user. Upon receipt of a request to access a particular service or portion of the provider network, the frontend service(s) 115 may verify the user as having permission to access the service or portion of the provider network with the IAM service 160. Similarly, when the user attempts to establish a connection with a development environment via the proxy service 140, the proxy service 140 can verify the identity and permissions of the user with the IAM service 160.

The frontend service(s) 115 may provide a public-facing web-based interface or command-line based interface to users. For example, the application 110 may be a web browser that submits and receives Hypertext Transfer Protocol (HTTP) requests and responses from the frontend service(s) 115. As another example, the application 110 may be an application that establishes communications with the frontend service(s) 115 via secure shell (SSH) communications through which a user can submit commands and receive responses. Upon receipt of a request from a user, the frontend service 115 may send messages to various backend services via one or more APIs that may not be directly accessible to a user, such as an API that provides users with on-demand development environments. Such development environments may include integrated development environments or notebook editors that include an editor to allow a developer to create a software application. The term editor is generally used below and may refer to a notebook or other development environment.

In the illustrated environment, the provider network 100 includes an editor manager service 105, an editor metadata data store 120, an instance pool manager service 107, an editor monitor service 109, and one or more editor instances 130A-130N hosted on computer systems of the provider network. A virtual private network 135 may isolate one or more of the editor instances 130, the editor manager service 105, the instance pool manager service 107, the editor monitor service 109, the editor metadata 120, and, optionally, the data store 145 within the provider network 100. In some contexts, the editor manager service 105 may be considered a backend service that vends an API accessible through the frontend service(s) 115 to provide users with the ability to access an editor on-demand. The editor manager service 105 and instance pool manager service 107 handle aspects of providing the on-demand editors to users including, for example, the provisioning of servers to host the editors, the loading of any context for an editor onto the provisioned servers, attaching the editor to the computing resource 150, and the termination of editors and associated cleanup.

The editor manager service 105 stores and retrieves data related to development environments in the editor metadata 120. In some embodiments, the editor metadata 120 is a relational database. Entries in the editor metadata may include a customer or user identifier that uniquely identifies customers or users with permission to access the associated editor, an editor identifier that uniquely identifies the editor (for use when restarting a saved editor session), an identifier of the instance in which the editor is running or last ran, an identifier of the computing resources to which the editor is attached or was last attached, an identifier of the location of a last snapshot or backup of editor configuration information, and an identifier of the state of the editor. States may include whether the editor is running on an instance, whether the editor has submitted a job to the computing resource 150 that remains pending, whether (and how long) the editor has been idle if idle, etc.

In some embodiments, a user logs into his or her account via the frontend service(s) 115 and is presented with a web page in a browser application 110. The web page includes the ability to request an editor. The web page may include the ability for the user to submit one or more parameters with the request for the editor. For example, if the user is attempting to resume a session using an existing editor, the user may specify an identifier that uniquely identifies the prior session with the editor. The identifier may be selected from a list of existing editor sessions that the user has accessed or are accessible to the user. As another example, if the user is launching a new editor, the user may specify a type of instance within which to launch the editor, the identity of the compute resources 150 to which to attach the editor (if already provisioned within the provider network), configuration information for a compute resource 150 (if not already provisioned within the provider network), etc. Upon receipt of the request to launch an editor, the frontend service(s) 115 passes along a request to the editor manager service 105 including the user-specified parameters, if any.

The editor manager service 105 receives editor launch requests and returns information to be sent back to the application 110, including connection information that the application 110 can use to establish a secure communications session with the launched editor. For example, the connection information may include an IP address of the proxy service 140 and a token to establish a secure communications session with an editor application via the proxy service 140. If the editor is a newly launched editor, the information may further include the editor identifier that uniquely identifies the editor. Between receiving the launch request and returning information to the frontend service(s) 115, the editor manager service 105 performs certain operations so that the application 110 can connect to an editor application.

Figure 3:
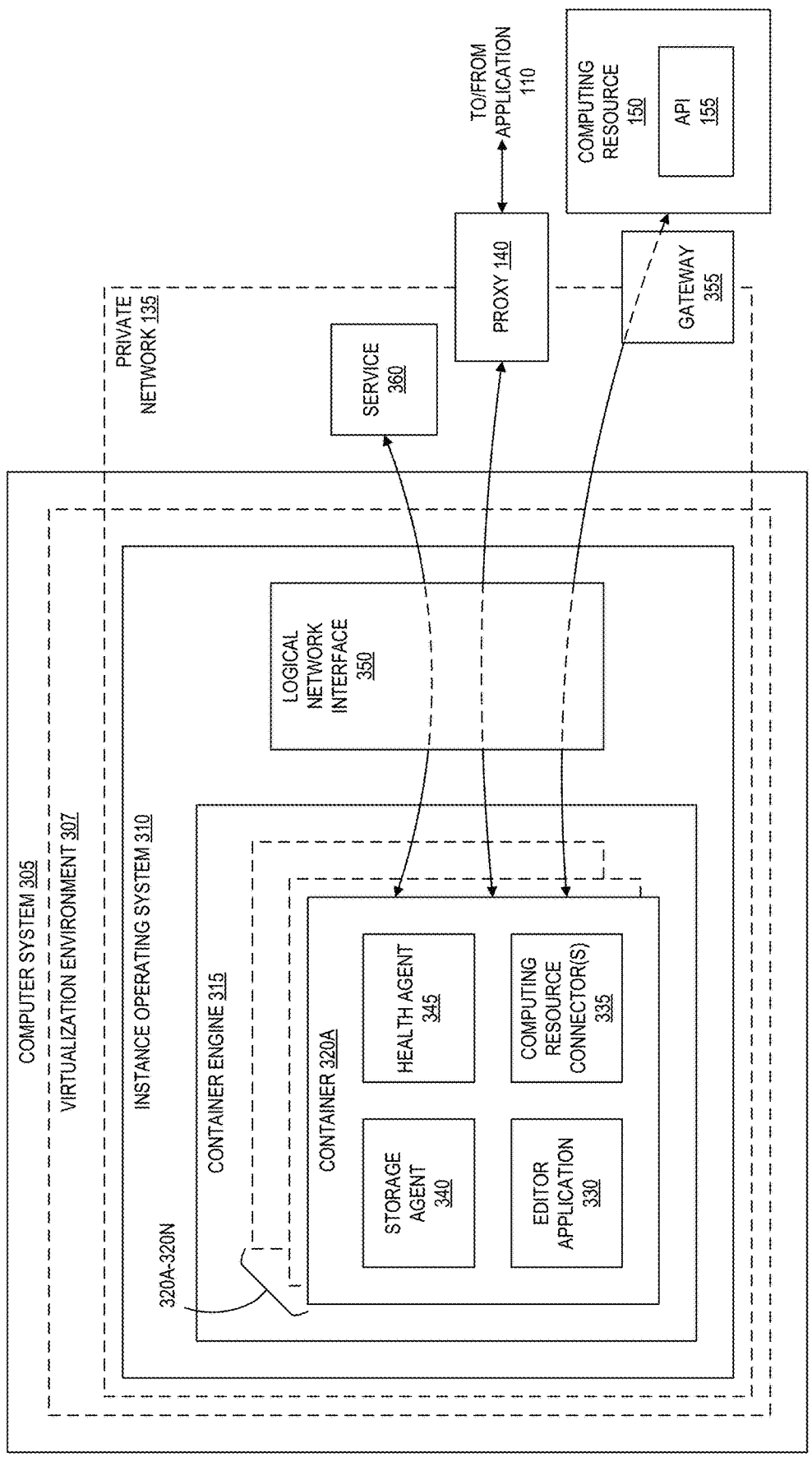
FIG. 3 is a diagram illustrating certain aspects of a hosted editor environment and associated communications according to some embodiments.
Figure 4:
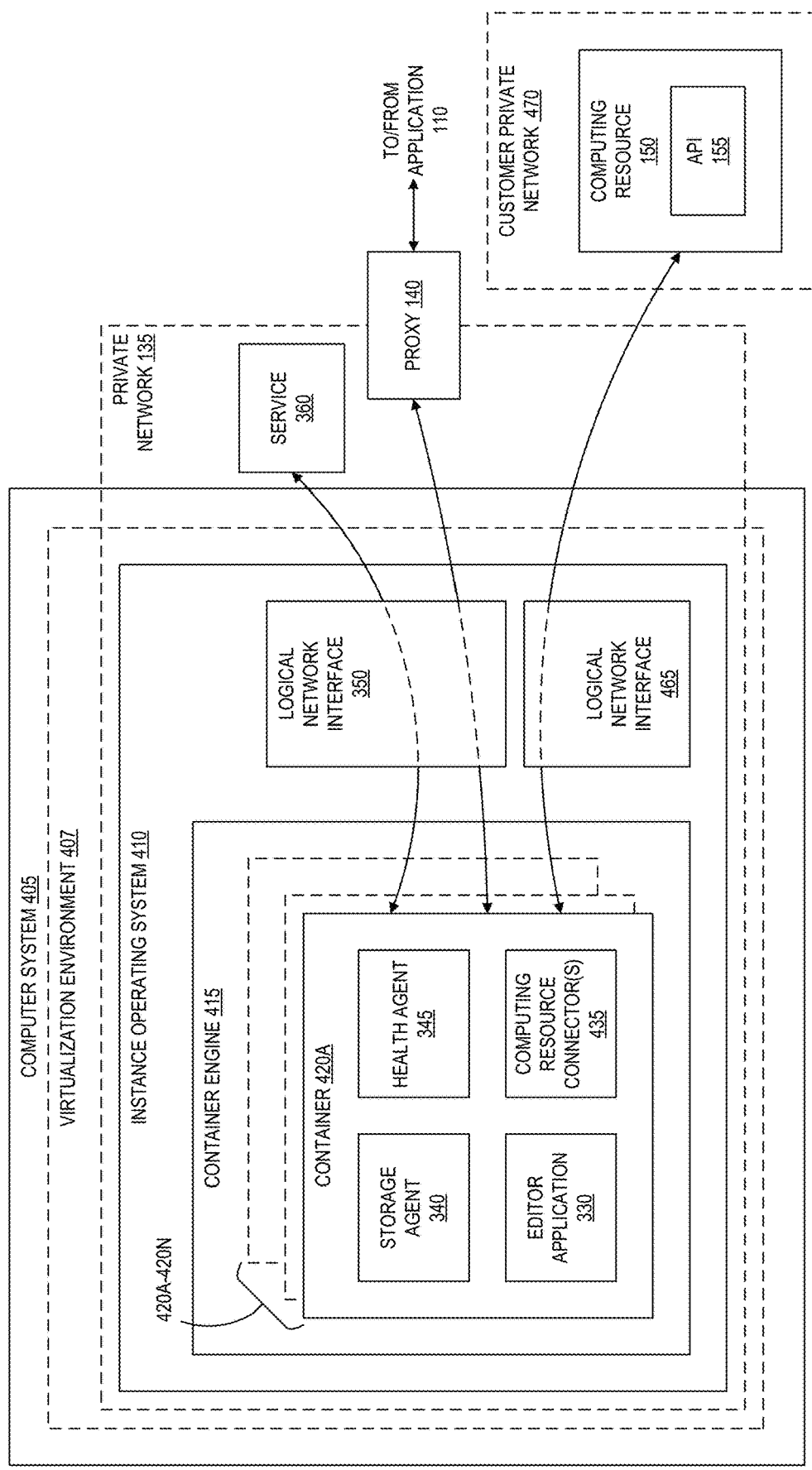
FIG. 4 is a diagram illustrating certain aspects of another hosted editor environment and associated communications according to some embodiments.

In the case where the launch request is to launch a new editor, the editor manager service 105 obtains an identifier of an instance to host the on-demand editor from the instance pool manager service 107. Additional details regarding the provisioning of computer systems to host the editors will be described below with reference to FIG. 2. For example, the instance pool manager service 107 may return an identifier of instance 130A. The editor manager service 105 can then send a message to the instance 130A to cause it to launch a new editor, the type of which may be specified in the launch request (e.g., a Jupyter notebook). As part of the same message to cause the instance 130A to launch a new editor or as a separate message, the editor manager service 105 may update the configuration of the editor to couple it to the computing resource 150 so that code authored or written by the user into the editor may be executed by the computing resource 150. In some embodiments, the launched editor application establishes a secure communications channel to the computing resource 150 (e.g., via a WebSocket) upon receipt of information identifying the computing resource 150 from the editor manager service 105. FIGS. 3 and 4 and the associated description provide additional details regarding exemplary editor environments. Once an editor is launched and configured, the editor manager service 105 generates connection information to be returned to the application 110 to allow the application 110 to connect to the launched editor. The editor manager service 105 further creates an entry in the editor metadata 120 including the identifiers associated with the launched editor, including an identifier that uniquely identifies the editor and which may be returned to the application 110.

In the case where the launch request includes an identification of an existing editor, the editor manager service 105 may obtain information related to the existing editor from the editor metadata 120. If the state of the editor in the editor metadata 120 indicates the editor is running on an editor host, the editor manager service 105 generates connection information to be returned to the application 110 to allow the application 110 to connect to the running editor. Otherwise, the editor manager service 105 obtains an identifier of an instance to host the on-demand editor from the instance pool manager service 107, as described in further detail below with reference to FIG. 2. The instance pool manager service 107 may return an identifier of instance 130A. The editor manager service 105 can then send a message to the instance 130A to cause it to retrieve and launch the latest snapshot or backup of editor configuration information as identified in the editor metadata 120. Note that in some embodiments, the latest snapshot or backup of editor configuration information is a container or is configuration data that can be loaded into a container, as described below. As part of the same message to cause the instance 130A to launch the editor or as a separate message, the editor manager service 105 may update the configuration of the editor to couple it to the computing resource 150 (e.g., if the computing resource 150 has changed). In some embodiments, the launched editor application establishes a secure communications channel to the computing resource 150 (e.g., via a WebSocket) upon receipt of information identifying the computing resource 150 from the editor manager service 105. FIGS. 3 and 4 and the associated description provide additional details regarding exemplary editor environments. Once the editor is launched and configured, the editor manager service 105 generates connection information to be returned to the application 110 to allow the application 110 to connect to the launched editor. The editor manager service 105 may update the entry associated with the editor identifier in the editor metadata 120 with, for example, the new state and instance identifiers.

The editor manager service 105 may receive an identification of the computing resource 150 to which to attach a new editor as part of a launch request or obtain an identification of the computing resource 150 from the editor metadata 120. In some embodiments, the editor manager service 105 may submit a request to the computing resources API 155 to verify the identified computing resources are operating. If not, the editor manager service 105 may return an error in response to the launch request indicating the requested computing resources are unavailable.

In some embodiments, the editor manager service 105 may allow a launch request to specify one or more parameters relating to a configuration of a computing resource 150 that is not yet provisioned or launched within the provider network 100. As part of launching an editor on an instance 130, the editor manager service 105 may also request another backend service (not shown) to launch the computing resource 150 having the requested configuration.

The application 110 receives connection information from the editor manager service 105 via the frontend service(s) 115. Upon receipt of the connection information, the application 110 can establish a communications session with the editor hosted on the instance 130A via the proxy service 140. In one embodiment, the application 110 establishes a WebSocket with the computing environment hosting the editor via the proxy service 140. The proxy service 140 may again verify the identity and permissions of the user making the connection request. The application 110 and/or proxy service 140 may use the connection information to identify an editor hosted on an instance 130 and securely route communications between the application 110 and the editor.

Once the application 110 has connected to the instance 130A, the user can interact with the editor and its environment to, for example, author code and cause it to be executed, generate documentation, etc. In some embodiments, the user can cause the instance 130A to pull existing code from or push new or updated code to an external code repository (e.g., GitHub). In some embodiments, the user can upload or fetch libraries or packages for use as part of software development.

In some embodiments, the environment which hosts the editor backs up the editor configuration information and user data to one or more data stores, such as a data store 145. The backups may be periodic or based on configuration changes to the editor by the user. In some embodiments, a user specifies the location(s) for the backups as part of the initial launch request or in subsequent communications with the editor manager service 105. The data store 145 may be an object data store associated with the user's or customer's account, a version-controlled code storage repository (e.g., a GitHub repository), or a combination of an object data store and a version-controlled code storage repository. By periodically backing up the editor configuration information, any user customizations of the editor environment may be preserved when the user returns to the editor even after the editor is terminated. Further, any configuration settings, such as the configuration of the editor application, the configuration of connector(s) that allow a user to submit code for execution on an associated computing resource 150 (described below), and any other state information to allow a user to later resume interactions with the editor after it has been terminated may be preserved. By periodically backing up the user data, including, but not limited to, the code the user has entered into the editor, the user can resume development efforts at a later time. While shown outside of the private network 135, the data store 145 may be addressable within the private network 135, in some embodiments.

The editor monitor service 109 monitors the health of the launched editor instances 130. As described below, editor instances 130 include a health agent that sends out a periodic heartbeat message including status information about the instance. Further, the absence of one or more consecutive heartbeat messages may indicate the instance has stopped responding. The editor monitor service 109 receives these messages and makes determinations regarding the health of the editor instances. For example, if an editor instance has failed to send five consecutive heartbeat messages, the editor monitor service 109 can treat the instance as non-responsive and send a message to the editor manager service 105 to cause the editor manager service 105 to re-launch the editor instance from the most recent backup. In some embodiments, the functionality of the editor monitor service 109 is combined with that of the editor manager service 105.

In some embodiments, the editor manager service 105 uses one or more backend services of the provider network 100. For example, the launch and configuration of a new editor may involve of a series of steps defined by a workflow, state machine, or data flow that can be submitted to and performed by another backend service of the provider network. Upon receiving a launch request, the editor manager service 105 may dispatch operations associated with launching an editor instance to another backend service or other backend services of the provider network 100, which notify the editor manager service 105 upon successful completion of the operations.

In some embodiments, the frontend service(s) 115 and/or the proxy service 140 access the editor metadata 120 without interacting with the editor manager service 105. For example, the frontend service(s) 115 may query the editor metadata 120 for a list of existing editors available to the user and send the list to the application 110 to allow the user to select one of the editors to launch (e.g., if not executing on an instance) or to connect to (e.g., if executing on an instance). As another example, the proxy service 140 may query the editor metadata 120 to obtain access control and/or security information upon receiving a request to connect to an editor instance from the application 110.

The illustrated components of the provider network 100 may each be implemented as software applications or services each executing on one or more computer systems coupled to the provider network 100. For example, the editor manager service 105 may be a service executed on one computer system and the instance pool manager service may be a service executed on the same or a different computer system.

Figure 2:
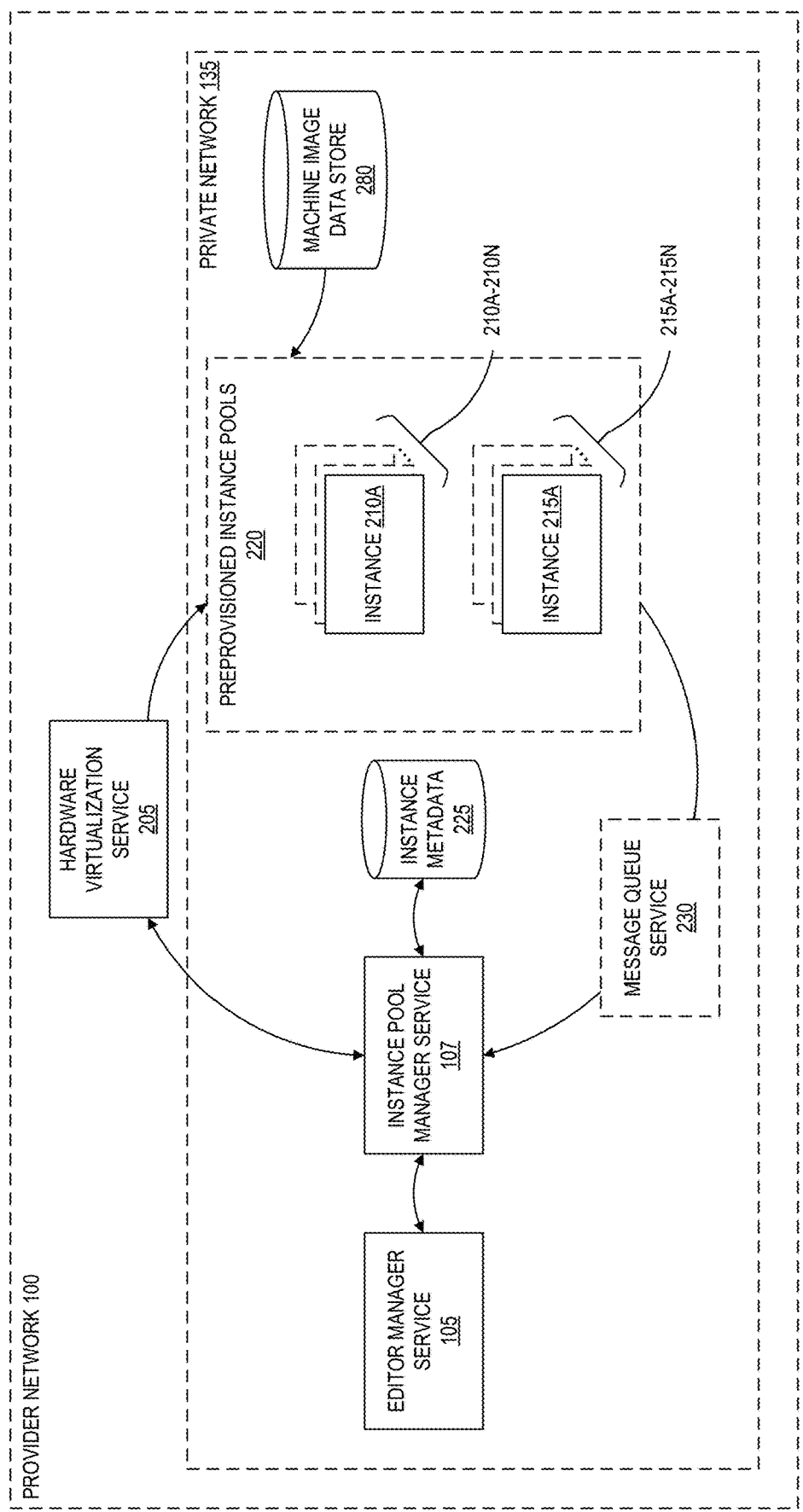
FIG. 2 is a diagram illustrating certain aspects of the provisioning of on-demand development environments according to some embodiments.

FIG. 2 is a diagram illustrating certain aspects of the provisioning of on-demand development environments according to some embodiments. To avoid the delay associated with provisioning servers to host editors after receiving a request from a user to launch an editor, the instance pool manager service 107 maintains one or more instance pools 220 that are running an editor hosting environment and can launch an editor on-demand. Such instances may be considered "pre-provisioned" or "warm" instances. As described above, the editor manager service 105 may submit a request to the instance pool manager service 107 to obtain an identifier of an instance that can host an editor. The instance pool manager service 107 tracks available instances in the instance metadata data store 225. In some embodiments, the instance metadata 225 is a relational database. Entries in the instance metadata 225 may include an instance identifier that uniquely identifies the instance, one or more configuration identifiers that identifies the configuration of the instance (e.g., the installed editors, the types of computing resources that the instance can attach to, the performance characteristics of the instance, etc.), an identifier of the pool to which the instance belongs (if multiple pools of different instance configurations are maintained), and an identifier of the state of the instance. States may include whether the instance is launching or has launched and is available.

In the illustrated embodiment, the instance pool manager service 107 maintains two pools 220: instances 210A-210N and instances 215A-215N. The instance pool manager service 107 may maintain more than one instance pool where different pools have different configurations (e.g., a pool for one set of editors and another pool for a different set of editors, a pool with an editor capable of connecting to certain computing resources and another pool with an editor capable of connecting to different computing resources, a pool with a higher instance performance than another pool, etc.).

In response to a request from the editor manager service 105, the instance pool manager service 107 returns an instance identifier associated with an instance in the pool that meets the parameters of the request, if any. For example, if the request is for an instance that can host a Jupyter notebook and communicate with a remote Apache Spark cluster, the instance pool manager service 107 selects an available instance from the pool that meets those parameters. Upon returning an instance identifier to the editor manager service 105, the instance pool manager service 107 deletes the entry associated with that instance from the instance metadata 225.

The instance pool manager service 107 replenishes pools 220. For example, the instance pool manager 107 may replenish a pool when an instance within a pool is provided in response to a request from the editor manager service 105 and subsequently removed from the pool. Alternatively, the instance pool manager 107 may wait until the number of instances within a pool falls below a threshold and request a group of new instances to add to the pool. To replenish instance pools, the instance pool manager service 107 requests the launch of new instances from a hardware virtualization service 205. As part of the request, the instance pool manager service 107 may specify a machine image that is preconfigured to host editors. The machine image may include one or more editors and one or more connectors that facilitate communications between an editor and a computing resource 150. Machine images of varying configurations may be stored in a machine image data store 280 that are accessed during the launch of an instance by the underlying host computer system (not shown). For example, the hardware virtualization service 205 may send a message to a host computer system to launch an instance using a specific machine image located within the machine image data store 280, and the host computer system will fetch the specified machine image and launch the instance. The hardware virtualization service 205 launches an instance based on the request and returns an instance identifier to the instance pool manager service 107. The instance pool manager service 107 updates the instance metadata 225 with an entry for the newly launched instance and other associated identifiers, including an indication that the instance is available. In some embodiments, the instances in the pools may send messages to the instance pool manager service 107 to indicate when the instance has fully booted. In some embodiments, the instances may send a heartbeat message to the instance pool manager service 107 to provide an indication when an instance in a pool may have failed. If an instance fails to provide a heartbeat message, the instance pool manager service 107 may send a message to the hardware virtualization service 205 to stop or terminate the instance and to launch a new instance to replace the failed instance. In some embodiments, messages from the instances within the pools 210, 215 are queued in a message queue service that the instance pool manager service 107 can periodically check for enqueued messages.

In some embodiments, a single instance may host multiple editors. For example, an instance may have two, four, eight, or some other number of editor slots within which to host isolated editors on the same instance. Entries in the instance metadata 225 may include the number of slots that are available with an instance and, as the instance pool manager service 107 assigns slots to editors in response to requests from the editor manager service 105, the instance pool manager service 107 may decrement the number of slots that are available in the instance metadata 225.

FIG. 3 is a diagram illustrating certain aspects of a hosted editor environment and associated communications according to some embodiments. In the illustrated embodiment, an editor application 330 is executed within a container 320A which is in turn executed by a container engine 315 (e.g., Docker). The container 320A may be one of a plurality of containers 320A-320N if multiple editors are hosted per-instance. The container engine 315 operates within the environment of an operating system 310 (e.g., Linux, Windows) hosted on a computer system 305 that includes physical computing resources such as a processor, memory, and input/output devices such as a network interface card. In some embodiments, the operating system 310 may be a guest O/S executing on a virtual machine within a virtualization environment 307. In such a case, the operating system 310 may be considered an "instance" hosted by the computer system 305.

In some embodiments, the editor application 330 is an editor application server that accepts connections (e.g., from application 110) to send and receive data to cause a remote device (e.g., the customer device 111) to render the editor application. For example, the editor application 330 may be a Jupyter notebook server configured to accept remote WebSocket or HTTPS connections from the application 110 via the proxy service 140 and to send data to the application 110 to cause the application 110 to display the editor.

In some embodiments, a container 320 includes one or more computing resource connectors 335. These connectors may be software libraries, commands, kernels, or other interfaces that allow a user to submit all or portions of code written or authored within the editor application 330 to the API 155 of the computing resource 150. For example, the sparkmagic library for Jupyter may be used to remotely submit jobs to a Spark cluster.

In some embodiments, execution of a user's code developed within the editor application 330 is executed using a combination of the computing resources 150 and the computer system 305. For example, a user's code may include control portions that are executed locally by the computer system 305 while compute- or data-intensive portions are executed using the computing resources 150. In some embodiments, the editor application may be connected to multiple, different computing resources 150 so that different portions of a user's code may execute on different computing resources 150.

In the illustrated embodiment, a container 320 includes a storage agent 340 and a health agent 345, although one or both of such agents may be omitted in other embodiments. The storage agent 340 backs up the configuration information associated with the editor application 330 to a data store, such as the data store 145, so that the editor instance can be resumed after a user terminates the communication session or the communications session times out. For example, the storage agent 340 may back up any code or other inputs a user has made within the editor. As another example, the storage agent 340 may back up any custom libraries or other customizations the user has made to an editor. In some embodiments, the backed-up data is configuration settings associated with a container, while in other embodiments, the backed-up data is a container. The health agent 345 monitors the aspects of the container 320 and reports them to a service 360, such as the editor manager service 105, the editor monitor service 109, and/or the instance pool manager service 107. Exemplary monitored activities include the duration in which communications to the editor application 330 have been idle (e.g., to detect when an application in communication with the editor application 330 may have shut down), and the state of code submissions to the computing resource 150 (e.g., whether a job has been submitted, whether the job has returned, etc.). The health agent 345 may report the monitoring information to the service 360 periodically in the form of a heartbeat message, the absence of which signifies to the service 360 that the associated container or other environment has stopped responding. The reported activity may be used by the service 360 to determine if and when a container (or the instance hosting a container) can be terminated or otherwise shut down.

In some embodiments, the storage agent 340 and/or the health agent 345 are executed outside of the environment of a container 320 within the environment of the operating system 410. In such cases, a single agent may handle the health and/or storage operations described above for each of the containers 320 executing within the container engine 315.

In some embodiments, the container(s) executing within the container engine 315 or the container engine 315 within the environment of the operating system 310 are operating with restricted permissions to prevent the editor application from executing arbitrary code on the computer system 305. In some embodiments, aspects of the editor application 330 are disabled, such as the ability to shut down the instance, delete files within the container or operating system, execute shell scripts, etc.

In some embodiments, the operating system 310, container engine 315, and a default container that includes the editor application 330, one or more computing resource connectors 335, the storage agent 340, and the health agent 345 are stored as part of a machine image that is launched by the instances in the pre-provisioned instance pools 220. When launching a new editor, the editor manager service 105 may send a message to the container engine 315 to launch a default container included within the machine image. When re-launching an editor, the editor manager service 105 may send a message to the container engine 315 to retrieve the latest backup or snapshot of the editor configuration information application (e.g., any user-customization to the editor and/or any configuration data to couple the editor application to a computing resource, etc.) from a data store (e.g., from the data store 145) and use that information to configure an editor launched with a default container or overwrite the configuration data of an editor launched with a default container. Note that in some embodiments, an entire container that includes the editor configuration information may be backed up to a data store 145, and the container engine 315 may retrieve and launch the backed-up container.

In the illustrated communications configuration, the environment of the operating system 310 includes a logical network interface 350 that allows applications such as the container engine 415 or container(s) 320 to send information to and receive information from other applications or services of the provider network 100. For example, communications between the editor application 330 and an external application (e.g., the application 110) via the proxy service 140 pass through the logical network interface 350. As another example, communications between the agents 340, 345 and the service 360 pass through the logical network interface 350. As yet another example, communications between the editor application 330 and the computing resource 150 pass through the logical network interface 350. Such communications may transit into and out of the private network 135 via a gateway 355 to reach other parts of the provider network.

FIG. 4 is a diagram illustrating certain aspects of another hosted editor environment and associated communications according to some embodiments. In general, the above descriptions of the computer system 305, virtualization environment 307, instance operating system 310, container engine 315, and the containers 320 are applicable to the computer system 405, virtualization environment 407, instance operating system 410, container engine 415, and containers 420, respectively. In the illustrated communications configuration, the environment of the operating system 410 includes two logical network interfaces 350, 465. As in FIG. 3, the logical network interface 350 facilitates communications between applications executing within the environment of the operating system 410 and other applications or services of the provider network 100. Such communications include communications between the editor application 330 and an external application (e.g., the application 110) via the proxy service 140 and communications between the agents 340, 345 and the service 360. In some scenarios, the second logical network interface 465 is used for communications between the editor application 330 and the computing resource 150. Such scenarios may include if the computing resource 150 is part of a customer private network 470 that has a security policy that prevents communications to or from private network 135. To add the second logical network interface 465, The editor manager service 105 creates or has created a new logical network interface associated with the customer account that controls the private network 470. In some embodiments, the editor manager service 105 configures or causes the update of the configuration of one or more security parameters or policies associated with the newly created logical network interface and/or the network interface associated with the computing resource 150 to permit the newly created logical network interface to communicate on the customer private network 470 with the computing resource 150. The editor manager service 105 then causes the newly created logical network interface to attach to the instance operating system 410, illustrated as logical network interface 465. The editor manager service 105 may cause the attachment by sending a message to the virtualization environment 407, the instance operating system 410, or a hardware virtualization service (not shown) to attach the new logical network interface to an instance. Upon attachment of the logical network interface 465 to the instance 410, the editor manager service 105 configures the instance 410 and/or computing resource connector(s) 435 such that communications between the editor application 330 and the computing resource 150 pass through the logical network interface 465.

As explained above, the health agent 345 may send messages to the editor manager service 105 and/or the instance pool manager service 107. The recipient of the messages from the health agent 345 may use the messages to determine that an editor has been idle for some amount of time. An idle determination may be based on communications activity between an editor and the proxy service 140. If an editor is deemed idle for an amount of time that exceeds some threshold (e.g., thirty minutes), the recipient of the status messages can free up resources of the provider network by, for example, stopping the instance that is hosting an idle editor (if no other editors are being hosted)

or freeing up an editor slot on an instance (if an instance hosts multiple editors). In some embodiments, the recipient of the messages also causes any additional network interfaces attached to the instance to detach from the instance, update any security policies or parameters that were modified to enable communications between the editor and the computing resources using the additional network interface(s), and delete any logical network interfaces that were created.

Figure 5:
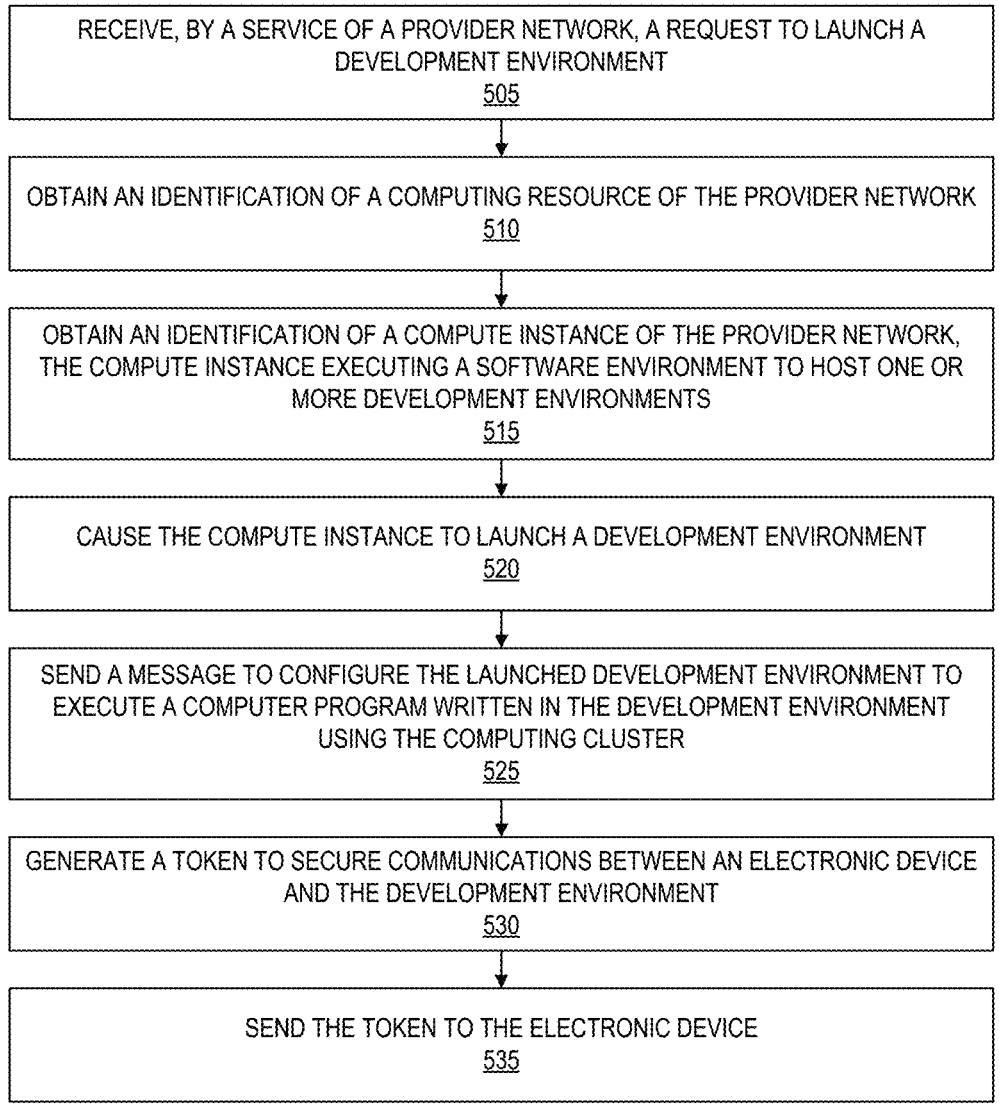
FIG. 5 is a flow diagram illustrating operations of a method for providing an on-demand development environment according to some embodiments.

FIG. 5 is a flow diagram illustrating operations of a method for providing an on-demand development environment according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the editor manager service 105 and/or the instance pool manager service 107 of the other figures. Other details regarding operations of the editor manager service 105, the instance pool manager service 107, and/or the other components illustrated in the other figures are provided elsewhere herein.

The operations include, at block 505, receiving, by a service of a provider network, a request to launch a development environment. For example, a user may cause a customer device 111 or, more specifically, an application 110 executing on the customer device 111 to issue a request to launch a development environment such as a notebook development environment. The request may be sent through one or more intermediate networks 106 to a frontend service 115 of a provider network 100. The frontend service may relay the request or issue another request in response to receipt of the request to the editor manager service 105, which processes received requests for development environments as described herein.

The operations include, at block 510, obtaining an identification of a computing resource of the provider network. For example, the user may include an identification of a computing resource, such as a computing cluster, distributed data store, or the like in the request for the development environment that is obtained by the editor manager service 105. In some cases, the request to launch a development environment may specify an existing development environment which the editor manager service 105 can use to obtain the identification of a computing resource (e.g., from the editor metadata 120). The identified computing resource may be leveraged by the development environment to execute code authored or written within the development environment.

The operations include, at block 515, obtaining an identification of a compute instance of the provider network, the compute instance executing a software environment to host one or more development environments. For example, the editor manager service 105 can communicate with the instance pool manager service 107 which maintains a pool of pre-provisioned instances that are configured with a software environment within which to host a development environment. The instance pool manager service 107 may return an identifier of one of the instances in response to the request from the editor manager service 105.

The operations include, at block 520, causing the compute instance to launch a development environment. For example, the editor manager service 105 may send one or more messages to the identified instance to cause the instance to launch a development environment. For example, the message may be received by an operating system or container engine, such as those illustrated in FIGS. 3 and 4 and described above, to cause the launch of a development environment.

The operations include, at block 525, sending a message to configure the launched development environment to execute a computer program written in the development environment using the computing cluster. For example, the editor manager service 105 may send a message to the instance operating system 310, container engine 315, container 320, editor application 330, or computing resource connector(s) 335 to configure the editor so that when a user attempts to execute some portion of code, the editor submits the code via the appropriate computing resource connector to the remote computing resource, such as the computing cluster. The editor application 330 and/or the computing resource connector 335 may include one or more configuration parameters that can be used to specify the remote location of the computing resource. Upon receipt of the message from the editor manager service 105, the instance operating system 310, container engine 315, container 320, editor application 330, and/or computing resource connector(s) 335 may update one or more configuration settings to attach the editor application 330 to the computing resource.

The operations include, at block 530, generating a token to secure communications between an electronic device and the development environment and, at block 535, sending the token to the electronic device. For example, the editor manager service 105 may generate and send a token to the customer device 111 that the customer device 111 can use to establish a secure communications session with the development environment (e.g., via the proxy service 140).

While described with reference to development environments, the architecture disclosed herein may be used to a host a variety of other types of software applications that interact with computing resources 150. For example, a software developer may author code to generate analytics related to a dataset using an editor application and submit the job or task to the computing resources 150. Sometime later, after the job or task has completed, the developer or another user may launch a viewer application on a compute instance managed by a service of the provider network (e.g., a "viewer manager service") that allows the user to retrieve the results of completed jobs or tasks from the computing resources 150 for further analysis.

By managing the hosting and configuration of the software applications that interact with computing resources 150 as described herein, the disclosed services reduce the need for users to have domain-specific knowledge of the architectural or configuration details of the provider network such as how to configure and launch a host within the provider network, how to install and setup a development environment on the host, or how to connect the development environment to the wide array of computational resources offered by the provider network. Instead, users can focus on developing compute- and/or data-intensive software applications for data analytics, data exploration, data transformation, data science, business intelligence, or machine learning that leverage the high-performance distributed computing and data storage resources of the provider network.

Figure 6:
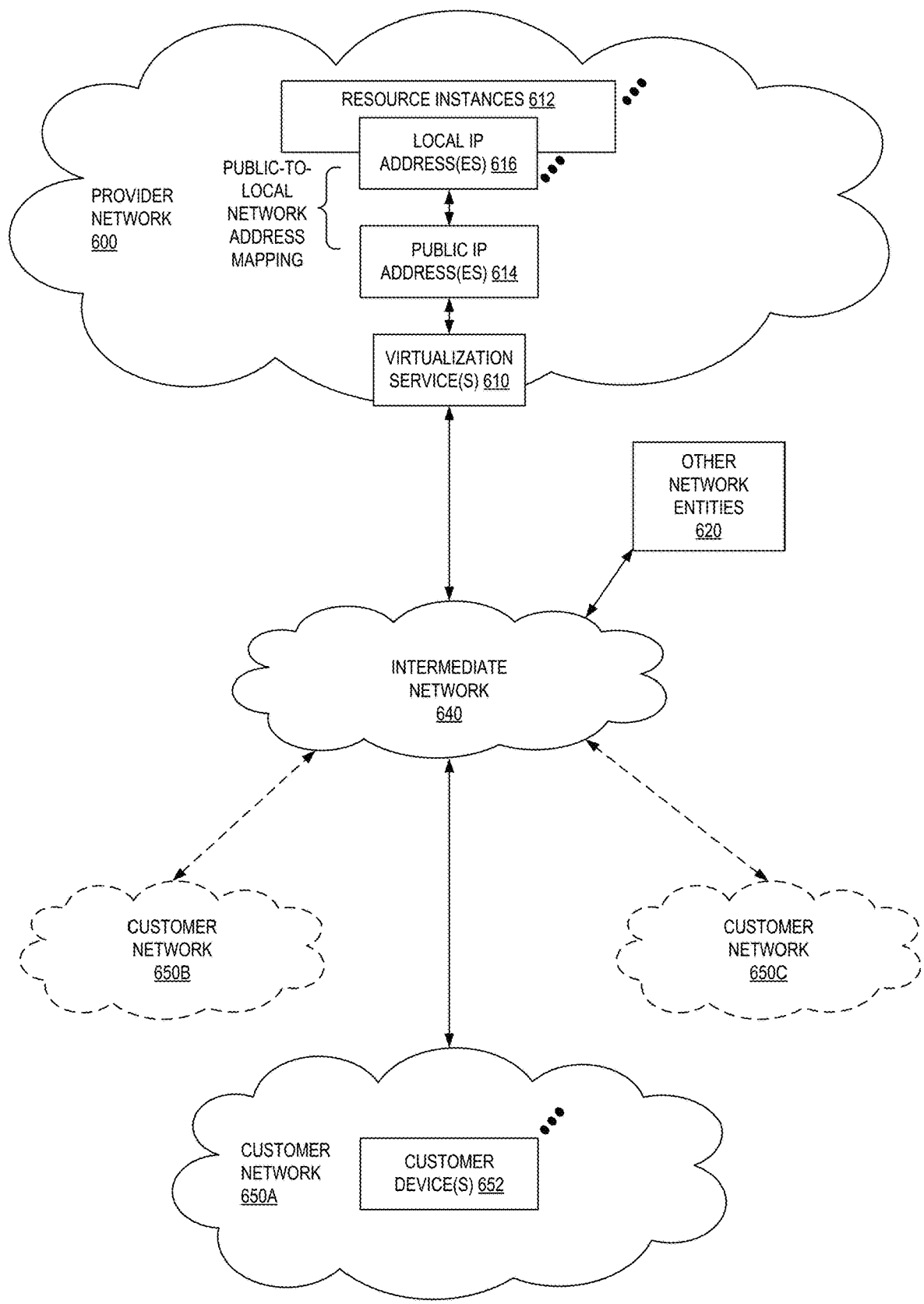
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Such instances 612 may include the computing resource 150 described above with reference to the other figures, such as a computing cluster or distributed data store.

Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
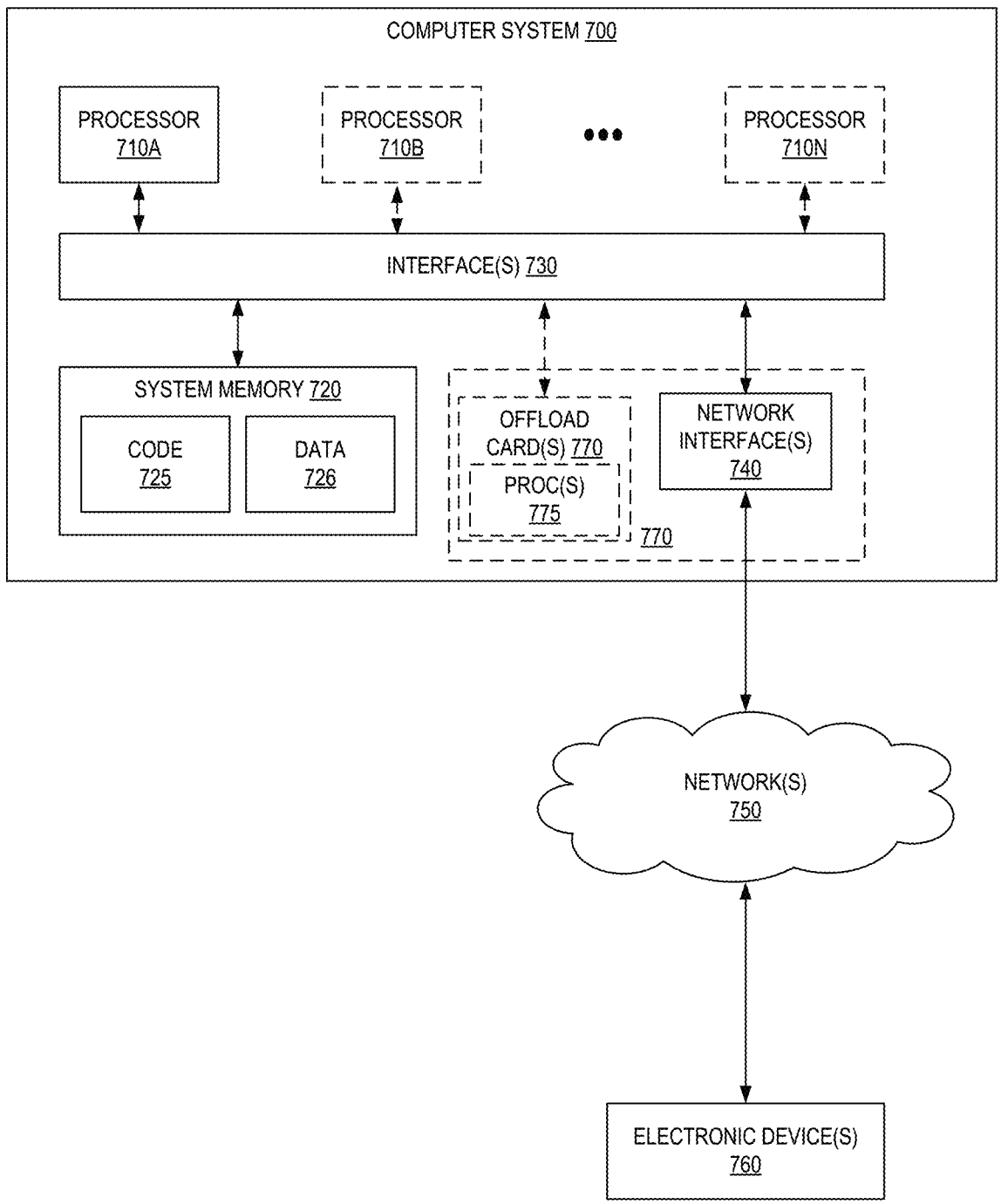
FIG. 7 is a block diagram illustrating an example computer system that may be used in some embodiments.

In some embodiments, a system that implements a portion or all of the techniques for providing an on-demand development environment as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities (e.g., from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java@, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., instances 130A-130N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a service of a provider network, a request to launch a development environment originating from an electronic device in communication with the provider network via a frontend interface;
obtaining, by the service, an identification of a computing cluster of the provider network;
obtaining, by the service, from within the provider network, an identification of a compute instance of the provider network, the compute instance executing a software environment to host one or more development environments including the requested development environment;

causing, by the service, the compute instance to launch the requested development environment;

sending, by the service, a message to configure the launched development environment to execute a computer program written in the launched development environment using the computing cluster;

generating, by the service, a token to secure communications between the electronic device and the launched development environment; and sending, by the service, the token to the electronic device.

2. The computer-implemented method of claim 1, wherein the compute instance includes a first logical network interface and further comprising:

causing, by the service, an attachment of a second logical network interface to the compute instance; and sending, by the service, a message to configure the launched development environment to communicate with the computing cluster using the second logical network interface.

3. The computer-implemented method of claim 1, wherein the launched development environment is executed within a container executing on the compute instance.

4. A computer-implemented method comprising:

receiving, by a service of a provider network, a request originating from an electronic device in communication with the provider network to launch an application;

obtaining, by the service, from within the provider network, an identification of a compute instance hosted by a first computer system of the provider network, the compute instance executing a software environment to host one or more applications including the requested application;

causing, by the service, the compute instance to launch the application, wherein the launched application is to execute a computer program using a computing resource hosted by at least a second computer system of the provider network;

generating, by the service, a token to secure communications between the electronic device and the application; and sending, by the service, the token to the electronic device.

5. The computer-implemented method of claim 4, wherein the compute instance includes a first logical network interface and further comprising:

causing an attachment of a second logical network interface to the compute instance; and sending a message to configure the launched application to communicate with the computing resource using the second logical network interface.

6. The computer-implemented method of claim 4, wherein the launched application is executed within a container executing on the compute instance.

7. The computer-implemented method of claim 6, wherein the container includes an agent that backs up a configuration of the launched application.

8. The computer-implemented method of claim 4, wherein the request includes an identification of the computing resource.

9. The computer-implemented method of claim 4, wherein the compute instance is one of a plurality of pre-provisioned compute instances configured to host the application.

10. The computer-implemented method of claim 4, wherein the compute instance is hosted by the first computer system in a virtualization environment.

11. The computer-implemented method of claim 4, wherein the launched application is configured based on a backup associated with a previous execution of the application.

12. The computer-implemented method of claim 4, wherein the service and the first computer system are part of a first virtual private network and the second computer system is part of a second virtual private network.

13. A system comprising:

at least a first computer system of a provider network to implement a hardware virtualization service; and a second computer system of the provider network to implement an application manager service, the application manager service including instructions that upon execution cause the application manager service to:

receive an indication of a request to launch an application sent from an electronic device in communication with the provider network via a web browser application;

obtain, from within the provider network, an identifier of a compute instance, wherein the compute instance is one of a plurality of compute instances pre-provisioned by the hardware virtualization service and configured to host the requested application;

cause the compute instance to launch the application, wherein the launched application is to execute a computer program using a computing resource hosted by at least a third computer system of the provider network;

generate a token to secure communications between the web browser application and the application; and send the token to the web browser application.

14. The system of claim 13, wherein the compute instance includes a first logical network interface and wherein the instructions that upon execution further cause the application manager service to:

cause an attachment of a second logical network interface to the compute instance; and send a message to configure the launched application to communicate with the computing resource using the second logical network interface.

15. The system of claim 13, wherein the launched application is executed within a container executing on the compute instance.

16. The system of claim 15, wherein the container includes an agent that backs up a configuration of the launched application.

17. The system of claim 13, wherein the request includes an identification of the computing resource.

18. The system of claim 13, wherein the compute instance is hosted by a fourth computer system of the provider network in a virtualization environment.

19. The system of claim 13, wherein the launched application is configured based on a backup associated with a previous execution of the application.

* * * * *